(12) United States Patent
Nakano et al.

(10) Patent No.: US 11,125,652 B2
(45) Date of Patent: Sep. 21, 2021

(54) TEST METHOD FOR WEAR RESISTANCE PERFORMANCE, METHOD OF MANUFACTURING TREAD RUBBER, METHOD OF MANUFACTURING TIRE, AND TIRE

(71) Applicant: SUMITOMO RUBBER INDUSTRIES, LTD., Hyogo (JP)

(72) Inventors: Shinya Nakano, Kobe (JP); Toshio Tada, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 311 days.

(21) Appl. No.: 16/434,503

(22) Filed: Jun. 7, 2019

(65) Prior Publication Data

US 2020/0011766 A1 Jan. 9, 2020

(30) Foreign Application Priority Data

Jul. 3, 2018 (JP) .............................. JP2018-127023

(51) Int. Cl.
*G01M 17/02* (2006.01)
*B29D 30/00* (2006.01)

(52) U.S. Cl.
CPC ....... *G01M 17/022* (2013.01); *B29D 30/0061* (2013.01); *B29D 2030/0066* (2013.01)

(58) Field of Classification Search
None
See application file for complete search history.

(56) References Cited

U.S. PATENT DOCUMENTS

| 4,995,197 | A | * | 2/1991 | Shieh | ...................... | B24B 5/366 |
|||||||451/1|
| 8,474,311 | B2 | * | 7/2013 | Cuttino | ............... | G01M 17/021 |
|||||||73/146|
| 8,806,931 | B2 | * | 8/2014 | Cuttino | ................. | G01M 17/02 |
|||||||73/146|
| 9,038,449 | B2 | * | 5/2015 | Cuttino | ................. | G01M 17/02 |
|||||||73/146|
| 10,718,700 | B2 | * | 7/2020 | Kitani | ...................... | G01N 3/56 |
| 2012/0186324 | A1 | * | 7/2012 | Neugebauer | ............. | G01N 3/56 |
|||||||73/8|
| 2013/0036790 | A1 | | 2/2013 | Hirayama | | |

FOREIGN PATENT DOCUMENTS

JP   2013-36900 A   2/2013
JP    5542104 B    7/2014

* cited by examiner

*Primary Examiner* — Andre J Allen
*Assistant Examiner* — Jermaine L Jenkins
(74) *Attorney, Agent, or Firm* — Greenblum & Bernstein, P.L.C.

(57) ABSTRACT

A test method of accurately evaluating wear resistance performance of a rubber material when used as a tread rubber of a tire, comprises the steps of: preparing a test piece of the rubber material having a ground contact surface extending in a circumferential direction; abrading the ground contact surface by rolling the test piece on a running surface of a wear testing machine at a slip ratio of not more than 3.5%; and evaluating the wear resistance performance of the test piece by comparing the amount of wear of the test piece with a predetermined threshold value.

16 Claims, 6 Drawing Sheets

TEST METHOD FOR WEAR RESISTANCE PERFORMANCE, METHOD OF MANUFACTURING TREAD RUBBER, METHOD OF MANUFACTURING TIRE, AND TIRE

TECHNICAL FIELD

The present invention relates to:
a test method of evaluating wear resistance performance of a rubber material when used as a tread rubber of a tire;
a method of manufacturing a tread rubber based on the composition of a test piece which has been evaluated as having good wear resistance performance through the test method;
a method of manufacturing a tire including the method of manufacturing the tread rubber; and
a tire having a tread rubber whose wear resistance performance has been evaluated as being good through the test method.

BACKGROUND ART

Conventionally, as a method of evaluating the wear resistance performance of a vulcanized rubber material, there has been known a method in which a rubber material is abraded by using an indoor wear testing machine such as a Laboratory Abrasion Tester LAT100, and the amount of wear is evaluated. (see Japanese Patent No. 5542104)

The Laboratory Abrasion Tester LAT100 has an abrasive disc rotating around an axis, and the outer circumferential surface of a cylindrical test piece of the rubber material is brought into contact with the surface of the rotating abrasive disc so as to roll on the surface of the abrasive disc. Thus, under a contact state close to that of a tire when mounted on a vehicle and running on a road surface, the test piece can contact with the abrasive disc.

However, even when such Laboratory Abrasion Tester LAT100 is used and the wear resistance performance of the rubber material is predicted, there is a problem with accuracy such that the predicted wear resistance performance may not match the actual wear resistance performance when the rubber material is used as the tread rubber of a tire.

In view of such a situation, the present inventor studied the wear resistance and found that the results of actual vehicle running tests have high correlation with the result of a laboratory abrasion test conducted under a low severity condition. The reason for this is presumed that, under low severity conditions, wear due to fatigue largely affects the wear resistance, whereas, under high severity conditions, wear due to crack growth largely affects the wear resistance. That is, it is supposed that actual vehicle running tests are performed mainly under low severity conditions. According to this supposition, it is considered as being important to conduct a laboratory abrasion test under low severity conditions in order to accurately evaluate the wear performance of a tire in actual vehicle running conditions.

SUMMARY OF THE INVENTION

It is therefore, an object of the present invention to provide a test method of evaluating wear resistance performance by which a test result having high correlation with the actual wear resistance performance of a tire can be obtained, and also a method of manufacturing a tread rubber, a method of manufacturing a tire, and a tire.

According to a first aspect of the present invention, a test method of evaluating the wear resistance performance of a rubber material when used as a tread rubber of a tire, comprises
a step of preparing a test piece of the rubber material having a ground contact surface extending in a circumferential direction,
a step of abrading the ground contact surface by rolling the test piece on a running surface (abrasive surface) of a wear testing machine at a slip ratio of not more than 3.5%, and
a step of evaluating the wear resistance performance of the test piece by comparing the amount of wear of the test piece with a predetermined threshold value.

In the test method of evaluating the wear resistance performance according to the present invention, it is preferable that the wear testing machine is a LAT100 Laboratory Abrasion Tester.

In the test method of evaluating the wear resistance performance according to the present invention, it is preferred that, in the step of abrading the ground contact surface, the contact pressure of the ground contact surface is 0.1 to 1 MPa, the rolling speed (circumferential velocity) is 1 to 50 km/h, and the rolling distance is 10 to 30 km.

In the test method of evaluating the wear resistance performance according to the present invention, it is preferable that, in the step of evaluating the wear resistance performance, the wear resistance performance of the test piece is evaluated as being good when the wear amount per unit area (cc/sq·m) of the test piece is less than or equal to a first threshold value which is $3.0 \times 10^{-5} \times$ the slip ratio $(\%)^{1.4}$.

In the test method of evaluating the wear resistance performance according to the present invention, it is preferable that, in the step of evaluating the wear resistance performance, the wear resistance performance of the test piece is evaluated as being good when the wear amount per unit area (cc/sq·m) of the test piece is less than or equal to a first threshold value which is $2.5 \times 10^{-5} \times$ the slip ratio $(\%)^{1.4}$.

In the test method of evaluating the wear resistance performance according to the present invention, it is preferable that the step of evaluating the wear resistance performance includes: comparing the wear amount per unit area (cc/sq·m) of the test piece with a second threshold value which is $1.0 \times 10^{-6} \times$ the slip ratio $(\%)^{1.4}$.

In the test method of evaluating the wear resistance performance according to the present invention, it is preferable that the step of evaluating the wear resistance performance includes: comparing the wear amount per unit area (cc/sq·m) of the test piece with a second threshold value which is $3.0 \times 10^{-6} \times$ the slip ratio $(\%)^{1.4}$.

In the test method of evaluating the wear resistance performance according to the present invention, it is preferable that, in the step of evaluating the wear resistance performance, the wear resistance performance of the test piece is evaluated as being good when the wear amount per unit area (cc/sq·m) of the test piece is equal to or more than a second threshold value which is $3.0 \times 10^{-6} \times$ the slip ratio $(\%)^{1.4}$.

According to a second aspect of the present invention, a method of manufacturing a tread rubber is for manufacturing a tread rubber based on the composition of the rubber material of the test piece whose wear resistance performance has been evaluated as being good through the test method of evaluating the wear resistance performance according to the present invention.

According to a third aspect of the present invention, a method of manufacturing a tire comprises a step of manufacturing a tread rubber based on the composition of the rubber material of the test piece whose wear resistance performance has been evaluated as being good through the test method of evaluating the wear resistance performance according to the present invention.

According to a fourth aspect of the present invention, a tire comprises a tread rubber of which wear amount per unit area (cc/sq·m) is less than or equal to a first threshold value which is $3.0 \times 10^{-5} \times$ the slip ratio (%)$^{1.4}$, when the test piece is cut out from the tread rubber and measured according to the test method of evaluating the wear resistance performance according to the first aspect of the present invention.

In the first aspect of the present invention, the test piece is abraded by rolling it on the running surface (abrasive surface) of the wear testing machine under a condition of a slip ratio of 3.5% or less, namely, under a low severity condition. As a result, it is possible to accurately predict the wear resistance performance of the tread rubber of a tire in actual vehicle running conditions. This may greatly contributes to the shortening of the tire development period and the development of high performance tires.

In the second to fourth aspects of the present inventions, it is possible to provide a tread rubber having good wear resistance performance and a tire having such tread rubber with a short development time.

DETAILED DESCRIPTION OF THE INVENTION

Embodiments of the present invention will now be described in detail in conjunction with accompanying drawings.

A test method for wear resistance performance as an embodiment of the present invention (hereinafter sometimes referred to simply as the "test method") is a method of evaluating the wear resistance performance of a rubber material when used as a tread rubber of a tire.

Figure 1:
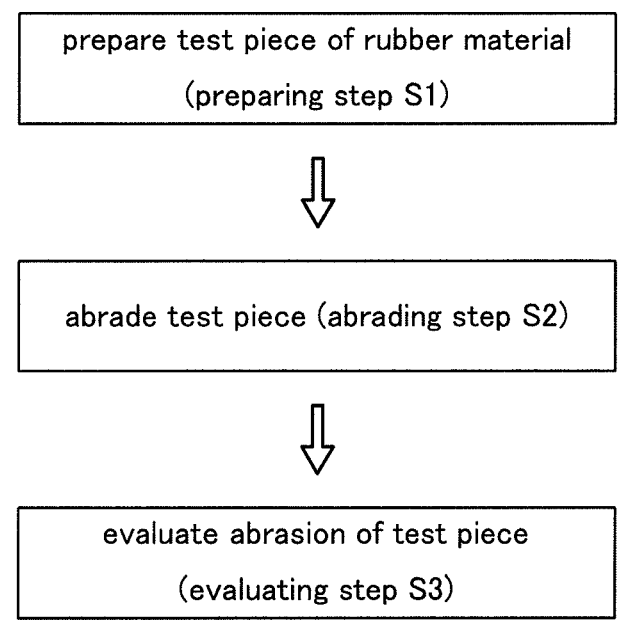
FIG. 1 is a flow chart showing a test method of evaluating the wear resistance performance according to the present invention.

FIG. 1 is a flowchart showing the procedure of the test method which includes a step S1 of preparing a test piece of the rubber material (preparing step S1), a step S2 of abrading the test piece (abrading step S2), and a step S3 of evaluating the abrasion of the test piece (evaluating step S3).

Figure 2:
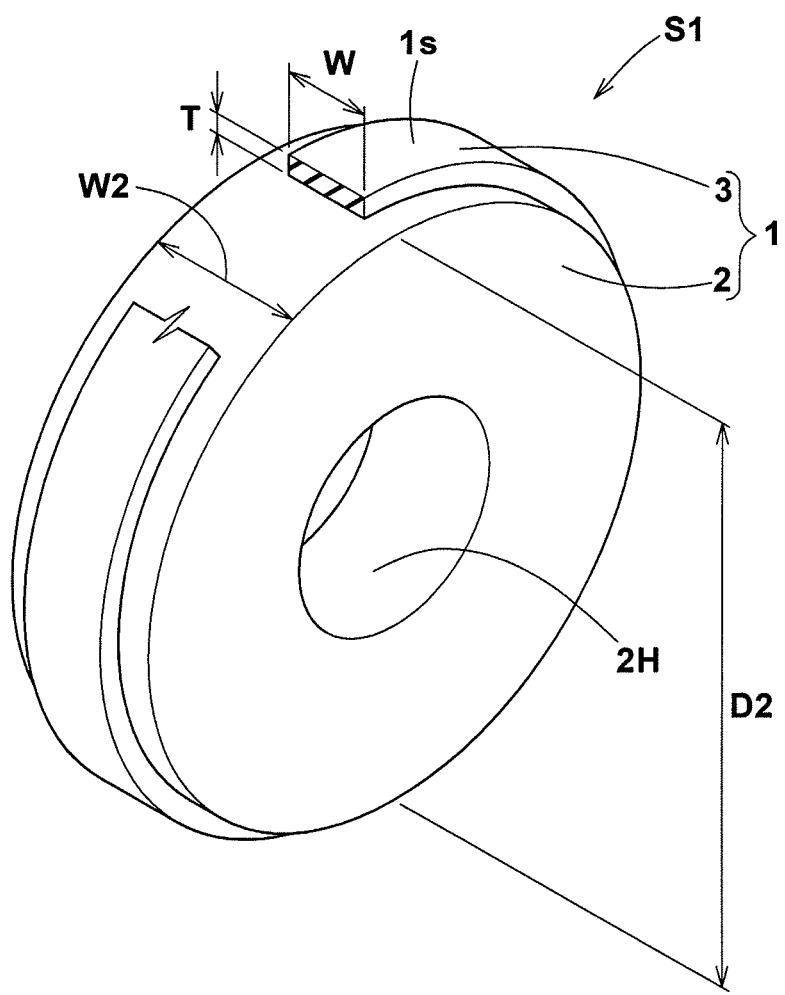
FIG. 2 is a perspective view showing an example of a test piece of a rubber material.

In the preparing step S1, the test piece 1 having a ground contact surface 1s extending in a circumferential direction as shown in FIG. 2 is prepared.

In this embodiment, the test piece 1 is formed by attaching a strip of the rubber material 3 to the outer circumferential surface of a cylindrical support 2.

Figure 3:
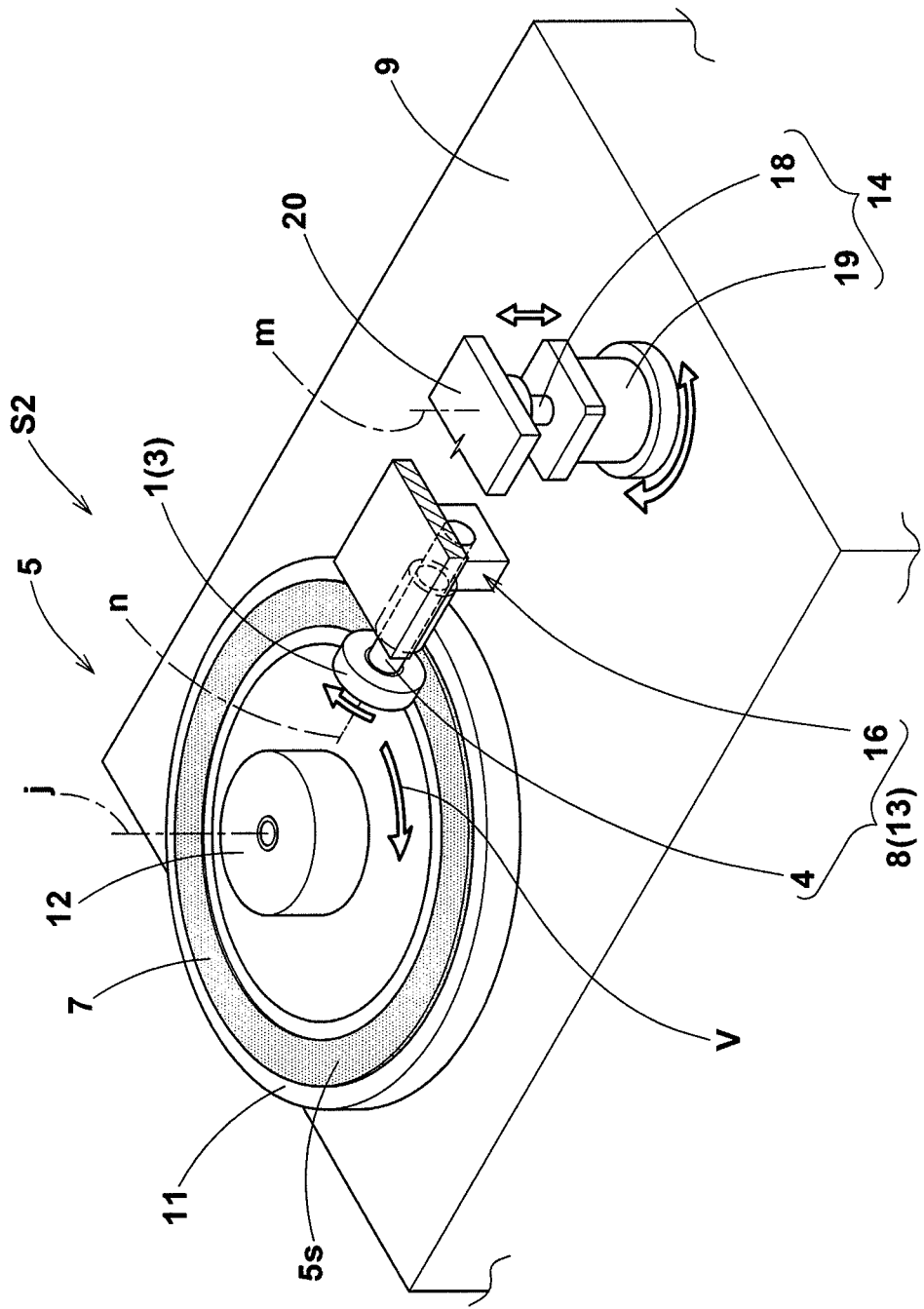
FIG. 3 is a perspective view showing a wear testing machine.

The cylindrical support 2 is provided at the center thereof with a central hole 2H for mounting this cylindrical support 2 to a support shaft 4 as shown in FIG. 3.

The outer circumferential surface of the rubber material 3 constitutes the ground contact surface 1s.

The thickness T of the strip of the rubber material 3 is preferably set in a range from 0.5 to 4.0 mm. The width W2 of the outer circumferential surface of the cylindrical support 2 is preferably set in a range from 15 to 22 mm. The outer diameter D2 of the cylindrical support 2 is preferably set in a range from 50 to 120 mm.

In the abrading step S2, as shown in FIG. 3, in order to abrade the ground contact surface 1s, the test piece 1 is rolled on the running surface 5s of the wear testing machine 5 at a slip ratio α of 3.5% or less.

Since the abrading step S2 is performed under the slip ratio α of 3.5% or less, namely, a low severity condition as described above, it is possible to accurately predict the actual wear resistance performance of a tire in actual vehicle running conditions.

Here, the slip ratio α is larger than 0%, and may have a value near zero. But, in order to shorten the process time of the abrasion process S2, it is preferred that the slip ratio α is 1% or more, more preferably 2% or more.

In the present embodiment, the wear testing machine 5 is a Laboratory Abrasion Tester LAT100. The wear testing machine 5 comprises a rotatable abrasive disc 7, a test piece support 8 for supporting the test piece 1, and a base 9 for supporting the abrasive disc 7 and the test piece support 8.

The abrasive disc 7, the test piece support 8 and the base 9 are housed in a housing (not shown) provided with, for example, a switch for operating and stopping the wear testing machine 5.

In the present embodiment, a disc-like grind wheel placed on a turntable 11 is used as the abrasive disc 7. The turntable 11 is integrally rotatably supported by a support shaft 12 protruding from the base 9.

In the present embodiment, the support shaft 12 is coupled to a motor (not shown) or the like built in the base 9.

Therefore, the abrasive disc 7 can rotate around the axis (j) of the support shaft 12 by the drive of the motor or the like.

The running surface 5s is formed by the abrasive surface of the abrasive disc 7. The running surface 5s of this example is a grinding surface, and preferably the particle size thereof is set in a range from 60 to 240 mesh, for example.

The abrasive disc 7 is not limited to the disc-like grind wheel, and may be a disk-like simulated road surface, for example, made from asphalt, concrete or the like.

The diameter of the running surface 5s (a circular running course) is preferably set in a range from 150 to 1,500 mm.

The test piece support 8 comprises a support shaft portion 13 rotatably supporting the test piece 1 about an axis (n) orthogonal to the axis (j), and a cylinder mechanism 14 moving the test piece 1.

The support shaft portion 13 comprises the support shaft 4 whose one end portion is inserted into the central hole 2H (shown in FIG. 2) of the test piece 1, and a fixing part 16 which supports the other end portion of the support shaft 4.

The cylinder mechanism 14 comprises a rod 18 which can be expanded and contracted in the longitudinal direction, a cylinder 19 which supports the rod 18 to be movable into and out of the cylinder, and a motor (not shown) for expanding and contracting the rod 18. One end portion of a connecting member 20 is fixed to the tip of the rod 18. The fixing part 16 is fixed to the other end portion of the connecting member 20. Thus, by expanding the rod 18, the cylinder mechanism 14 can separate the test piece 1 from the running surface 5s.

In the present embodiment, the cylinder 19 is supported on the base 9 so as to be rotatable around an axis (m), therefore, the test piece support 8 can set the slip angle θ (shown in FIG. 4) of the test piece 1 with respect to the running surface 5s.

Figure 4:
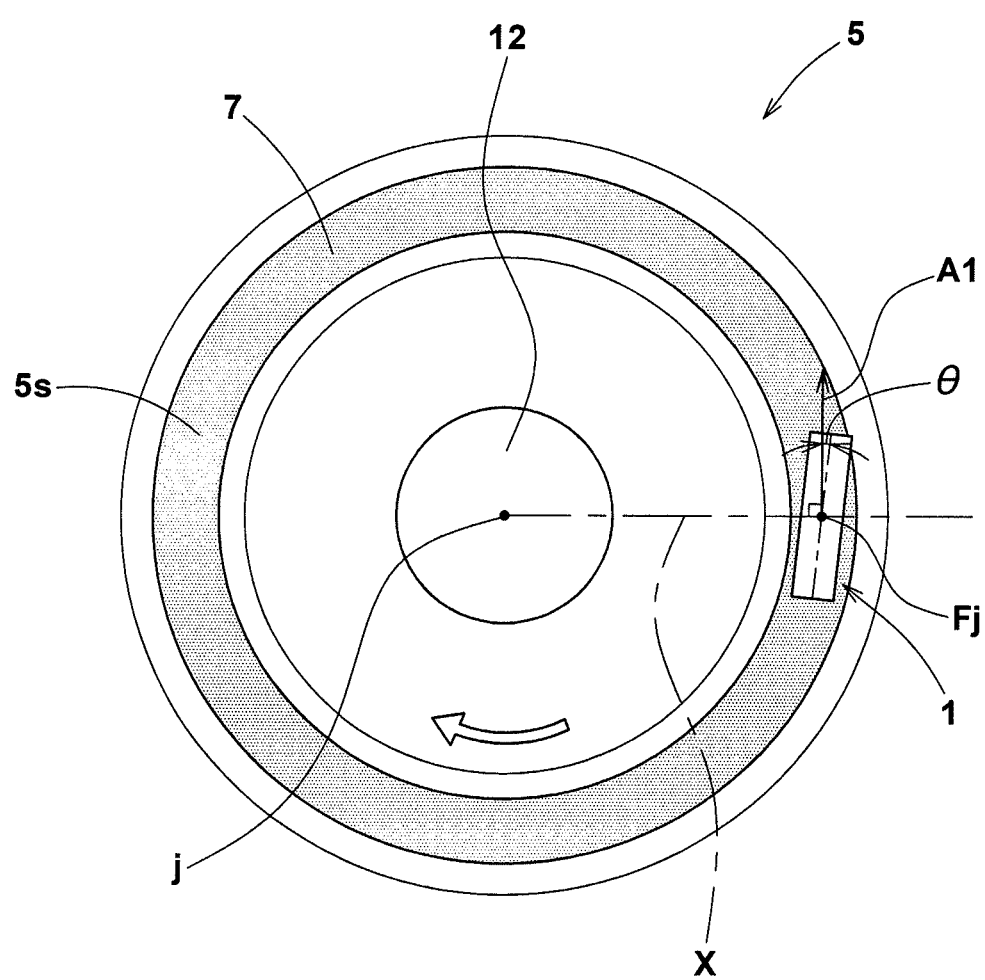
FIG. 4 is a plan view showing a step of abrading the test piece.

Incidentally, the slip angle θ is, as shown in FIG. 4, an angle between the direction orthogonal to the rotational axis of the test piece 1, and the traveling direction A1 of the test piece 1 which is orthogonal to a straight line X drawn between the axis (j) of the running surface 5s and the center Fj of the ground contact area F where the running surface 5s and the test piece 1 are in contact with each other.

Figure 5:
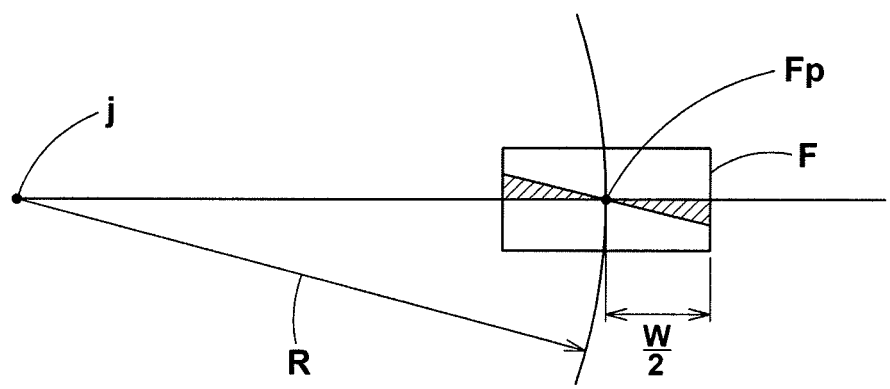
FIG. 5 is a diagram for explaining the slip ratio.

In the abrading step S2, in order to limit the slip ratio α to 3.5% or less, the slip angle θ is preferably set to be not more than 2 degrees, more preferably not more than 1 degree, most preferably 0 degree.

when the slip angle θ is 0 degree, as shown in FIG. 5, the slip ratio α can be obtained by the following expression (1)

$$\alpha = (W/2R) \times 100 (\%) \qquad (1)$$

wherein

"W" is the width of the rubber material 3 and corresponds to the width of the ground contact area F, and "R" is a distance from the axis (j) of the running surface 5s to the center Fj of the ground contact area F and corresponds to the turning radius of the test piece 1.

Here, the circumferential length of the circle centered on the axis (j) and passing through the ground contact area center Fj is $2\pi R$. The circumferential length of the circle centered on the axis (j) and passing through the outermost point of the ground contact area F is $2\pi(R+W/2)$.

When the test piece 1 rolls without slipping at the position of the ground contact area center Fj, a slip corresponding to the difference in circumferential length (namely, $2\pi(R+W/2) - 2\pi R = \pi W$) occurs in the test piece 1. Thus, a slip ratio corresponding to $\pi W/2\pi R = W/2R$ is generated.

Therefore, in order to limit the slip ratio α to 3.5% or less, it is necessary to set the width W of the rubber material 3 to be small and/or set the turning radius R to be large. For that purpose, the turning radius R is preferably set to be not less than 100 mm.

For example, when the turning radius R is 150 mm, the width W of the rubber material 3 needs to be set to 10.5 mm or less.

When the slip angle θ is 2 degrees or less, the influence of the slip angle θ on the slip is low and almost ignorable, therefore, the expression (1) can be used for practical purposes.

In the abrading step S2, in order to abrade the rubber material 3 under a lower severity condition, the rolling speed V (circumferential velocity) of the test piece 1 is preferably set in a range from 1 to 50 km/h.

Preferably, the load applied to the test piece is set so that the average pressure of the ground contact area F becomes in a range from 0.1 to 1 MPa, more preferably 0.2 to 0.8 MPa.

Further, as the abrading step S2 is performed under the condition that the slip ratio α is low, in order to ensure that the wear amount G of the test piece 1 becomes sufficient, the rolling distance L (running distance) of the test piece 1 is set in a range from 10 to 30 km, preferably 20 to 30 km. Such distance is considerably longer than conventional.

In the abrading step S2, it is preferable to abrade the rubber material 3 in the presence of sand-like particles between the test piece 1 and the running surface 5s. Thereby, it is possible to suppress the abrasion powder from reattaching to the test piece 1, which helps to improve the measurement accuracy of the wear amount of the test piece 1.

In the next evaluating step S3, the wear resistance performance of the test piece 1 is evaluated by comparing the amount of wear of the test piece 1 caused in the abrading step S2 with a predetermined threshold value K.

Specifically, when the wear amount G0 per unit area (cc/sq·m) of the test piece 1 is equal to or less than a first threshold value K1 determined by the following expression (2)

$$K1 = 3.0 \times 10^{-5} \times \text{the slip ratio } (\%)^{1.4} \qquad (2),$$

the wear resistance performance of the test piece 1 is evaluated as being good, wherein the wear amount G0 per unit area is a value obtained by dividing the wear amount G in cc caused in the abrading step S2 by the total area W×L in sq·m which is the product of the width W of the ground contact surface 1s and the rolling distance L, namely, G0=G/(W×L).

For example, the wear amount G (unit cc) can be obtained from the difference in the weight of the test piece 1 measured before and after the abrading step S2.

The expression (2) is derived from the results of experiments conducted by the inventor.

Specifically, a cylindrical reference test piece 1A is prepared from a standard rubber material having the composition evaluated to be excellent in the wear resistance performance in actual vehicle running conditions.

Then, according to the abrading step S2, the reference test piece 1A was subjected to the abrasion test. At this time, a plurality of abrasion tests were conducted changing the slip rate α (%), and data of the wear amount G for each slip rate α (%) was obtained, wherein the slip ratio α (%) was changed by changing the width W of the rubber material 3.

Figure 6:
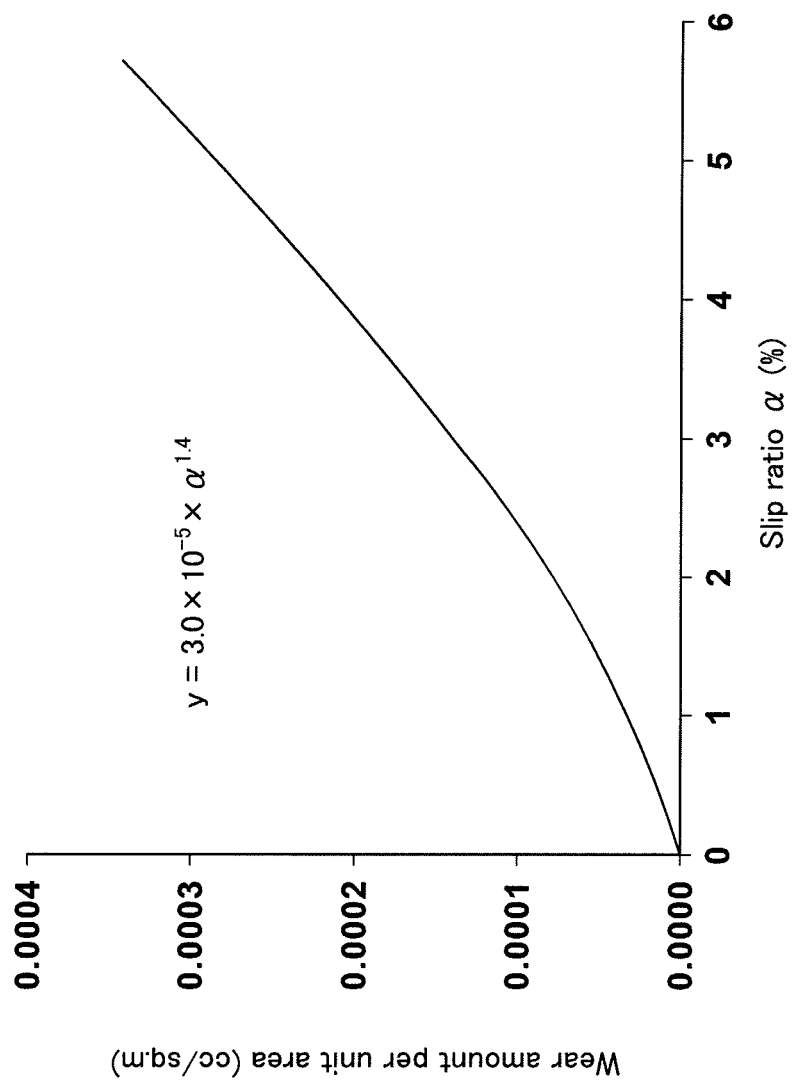
FIG. 6 is a graph showing a first threshold value as a function of the slip ratio.

Then, through regression analysis of the data, a regression expression (power regression expression) shown in FIG. 6 was obtained.

Therefore, when the abrasion test based on the abrading step S2 is performed on the test piece 1 to be evaluated, if the obtained wear amount G0 per unit area is equal to or less than the first threshold value K1 obtained by the expression (2), then the wear resistance performance of the test piece 1 can be evaluated as being good, that is, the wear resistance performance of the test piece 1 is equal to or better than that of the reference test piece 1A.

It is preferable to use the first threshold value K1 obtained by the following expression (3), instead of the expression (2), $$K1 = 2.5 \times 10^{-5} \times \text{the slip ratio } (\%)^{1.4} \qquad (3).$$

Thereby, it becomes possible to more reliably evaluate the wear resistance performance as being good.

If the wear amount G0 per unit area obtained in the abrading step S2 is too small, there is a possibility of adversely affecting other performance required for a tread rubber such as road grip performance. Therefore, it is preferable that the evaluating step S3 further includes: comparing the wear amount G0 per unit area with a second threshold value K2 obtained by the following expression (4):

$$K2 = 1.0 \times 10^{-6} \times \text{the slip ratio } (\%)^{1.4} \qquad (4).$$

If the wear amount G0 per unit area is smaller than the second threshold value K2 in this comparison, there is a possibility that other performance required for the tread rubber becomes inferior, therefore, it is possible to direct attention to other performance than the wear resistance performance.

It is more preferable to use the second threshold value K2 obtained by the following expression (5), instead of the expression (4), $$K2=3.0\times10^{-6}\times \text{the slip ratio (\%)}^{1.4} \quad (5).$$

In the test method of the present invention, the rubber material 3 used to make the test piece 1 can be formed by vulcanizing the composition to be evaluated into a strip shape. Further, it is also possible to cut out from the tread portion of the vulcanized tire to form the strip of the rubber material 3. Furthermore, the entire test piece 1 can be formed from the rubber material 3, including a portion like the cylindrical support 2.

Aside from the above-described Laboratory Abrasion Tester LAT100 which is commercially available, another machine can be used as the wear testing machine 5 as far as it has the same function as that of the Laboratory Abrasion Tester LAT100, namely, a function to abrade the outer circumferential surface (ground contact surface 1s) of the test piece 1 by making the outer circumferential surface contact with the surface of the rotatably supported abrasive disc 7, and making the test piece 1 roll over the surface of the rotatably supported abrasive disc 7.

The method of manufacturing a tread rubber according to the present invention is characterized in that the tread rubber is manufactured based on the composition of the rubber material of the test piece 1 of which wear resistance performance has been evaluated as being good in the test method.

In the manufacturing of the tread rubber, various known methods can be employed except for the use of the composition of the rubber material of the test piece 1 of which wear resistance has been evaluated as being good by the above-described test method.

The method of manufacturing a tire according to the present invention is characterized by comprising a step of manufacturing a tread rubber based on the composition of the rubber material of the test piece 1 of which wear resistance performance has been evaluated as being good in the test method. In the manufacturing of the tire, various known methods can be employed except for the manufacturing of the tread rubber based on the composition of the rubber material of the test piece 1 of which wear resistance performance has been evaluated as being good by the above-described test method.

The tire according to the present invention is characterized by a tread portion of which ground contact surface is formed by a tread rubber manufactured based on the composition of the rubber material of the test piece 1 of which wear resistance performance has been evaluated as being good by the above-described test method.

In other words, the tire has the tread rubber of which wear amount per unit area (cc/sq·m) is less than or equal to a first threshold value which is $3.0\times10^{-5}\times$a slip ratio (%)$^{1.4}$, when a test piece is cut out from the tread rubber and the wear amount per unit area (cc/sq·m) is measured by abrading the test piece on a moving abrasive surface of a wear testing machine at the slip ratio of not more than 3.5%.

In the tire, various known tire structures can be employed except for the tread rubber.

While detailed description has been made of preferable embodiments of the present invention, the present invention can be embodied in various forms without being limited to the illustrated embodiments.

EXAMPLE

Test pieces were prepared from three rubber materials A, B and C having different chemical compositions shown in Table 1. And the wear resistance performances thereof were evaluated according to the procedure shown in FIG. 1. The preparing step S1, the abrading step S2 and the evaluating step S3 are as follows.

<Preparing Step S1>
rubber materials A-C
  thickness T: 2.0 mm
  width W: 9.0 mm
cylindrical support 2
  width W2: 18.0 mm
  outer diameter D2: 80 mm
<Abrading step S2>
wear testing machine 5: Laboratory Abrasion Tester LAT100 manufactured by Heisen Yoko Co., Ltd.
load: 20 N
rolling speed v: 20 km/h
rolling distance L: 80 km
slip angle θ: 0 degree
turning radius R: 150 mm
slip ratio α: 3%
<Evaluating Step S3>
wear amount G0A per unit area of rubber material A: $8.2\times10^{-5}$ (cc/sq·m)
wear amount G0B per unit area of rubber material B: $7.8\times10^{-5}$ (cc/sq·m)
wear amount G0C per unit area of rubber material C: $7.1\times10^{-5}$ (cc/sq·m)
first threshold value K1 obtained from expression (2): $13.3\times10^{-5}$ Thus, the wear amounts G0A, G0B and G0C of the rubber materials A, B and C were all smaller than the first threshold value K1, and the rubber materials A, B and C can be supposed to have good wear resistance performance.

As the wear resistance performances of the rubber materials A to C, the wear amounts G0A, G0B and G0C are indicated in Table 2 by an index based on the wear amount G0A being 100, wherein the larger the value, the better the wear resistance.

Comparative Example

For comparison, under a condition of the slip ratio α of 5.7% as a high severity condition, the abrading step S2 was performed in the same way as above. The rubber materials A, B and C were the same as above. The difference was only the slip ratio α. And the wear amount G1A per unit area of the rubber material A, the wear amount G1B per unit area of the rubber material B, and the wear amount G1C per unit area of the rubber material c were measured.

As the wear resistance performances of the rubber materials A to C, the wear amounts G1A, G1B and G1C are indicated in Table 2 by an index based on the wear amount G1A being 100, wherein the larger the value, the better the wear resistance.

<Actual Vehicle Running Test>
Pneumatic tires of size 215/60R16 (rim size 16x6.5J) having different tread rubbers having the compositions of the rubber materials A, B and C were manufactured.

Each tire was mounted on all wheels of a Japanese 2000cc FR passenger car and run for 30,000 km in a tire test course. (tire pressure 230 kPa)

After running, the wear amount of the tread rubber was measured in a tread crown portion, and based on the wear amount, the wear resistance performance of each tire is indicated in Table 2 by an index based on the wear amount of the rubber material A being 100, wherein the larger the value, the better the wear resistance.

TABLE 1

| rubber material | (phr) | | |
|---|---|---|---|
| | A | B | C |
| SBR | 100 | 70 | 50 |
| BR | — | 30 | 50 |
| carbon black 1 | 65 | 65 | 65 |
| carbon black 2 | 10 | 10 | 20 |
| resin | 25 | 20 | 22.5 |
| wax | 2 | 2 | 2 |
| anti-aging agent 1 | 2.5 | 2.5 | 2.5 |
| anti-aging agent 2 | 1 | 1 | 1 |
| stearic acid | 1.5 | 1.5 | 2 |
| zinc oxide | 2.5 | 2.5 | 2.5 |
| sulfur | 1.5 | 1.5 | 0.5 |
| cross linker | — | — | 1 |
| vulcanization accelerator 1 | 1.5 | 1.5 | 1.5 |
| vulcanization accelerator 2 | 2.5 | 2.5 | 2.5 |

TABLE 2

| | Evaluation by actual vehicle running test | Estimation by comparative example | Estimation according to present invention |
|---|---|---|---|
| rubber material A | 100 | 100 | 100 |
| rubber material B | 105 | 140 | 105 |
| rubber material C | 115 | 130 | 115 |

As shown by Table 2, it was confirmed that, by employing the test method according to the present invention, the wear resistance performance of a tire in actual vehicle running conditions can be predicted with high accuracy.

The chemicals used for the compositions of Table 1 are as follows.

SBR: Buna 5L4525-0 manufactured by LANXESS CO., Ltd. (styrene content 25% by mass, non-oil-extended, non-modified S-SBR)
BR: Buna CB21 manufactured by LANXESS Co., Ltd. (high cis BR, BR synthesized using Nd catalyst, cis content: 98% by mass, ML (1+4) 100 degrees C.: 73, Mw/Mn: 2.4)
Carbon black 1: Seast 9H manufactured by Tokai Carbon Co., Ltd. (DBP oil absorption 115 ml/g, BET specific surface area 110 sq·m/g)
Carbon black 2: PRINTEX XE 2B manufactured by Degussa, Inc. (N2SA: 1000 sq·m/g, DBP: 420 ml/100 g)
Resin: NOVARES C10 resin manufactured by Rutogar (liquid coumarone indene resin, softening point 10 degrees C.)
Wax: Sunnoc N manufactured by Ouchi Shinko chemical industrial Co. Ltd.
Anti-aging agent 1: NOCRAC 6C manufactured by Ouchi Shinko chemical industrial Co. Ltd. (N-(1,3-dimethyl-butyl)-N'-phenyl-p-phenylenediamine)
Anti-aging agent 2: NOCRAC 224 manufactured by Ouchi Shinko chemical industrial Co. Ltd. (2,2,4-trimethyl-1,2-Dihydroquinoline polymer)
Stearic acid: Stearic acid "TUBAKI" made by NOF Corporation
Zinc oxide: Zinc flower type 2 made by Mitsui Metal Mining Co., Ltd.
Sulfur: Powdered sulfur made by Tsurumi Chemical Industry Co., Ltd.
Cross linker: vulcuren VP KA9188 manufactured by LANXESS CO., Ltd. (1,6-bis(N,N'-dibenzylthiocarbamoyldithio) hexane, sulfur content: 20.6% by mass)
vulcanization accelerator 1: Noccella NS manufactured by ouchi Shinko chemical industrial co. Ltd. (N-tert-butyl-2-benzothiazolylsulfenamide)
vulcanization accelerator 2: socoxynol D manufactured by Sumitomo Chemical co., Ltd. (diphenyl guanidine)

DESCRIPTION OF THE REFERENCE SIGNS 1 test piece
1s ground contact surface
3 rubber material
5 wear testing machine
5s running surface
G, G0 wear amount
K threshold value
K1 first threshold value
K2 second threshold value
S1 preparing step
S2 abrading step
S3 evaluating step

The invention claimed is:
1. A test method of evaluating wear resistance performance of a rubber material when used as a tread rubber of a tire, comprising
a step of preparing a test piece of the rubber material having a ground contact surface extending in a circumferential direction,
a step of abrading the ground contact surface by rolling the test piece on a running surface of a wear testing machine at a slip ratio of not more than 3.5%, and
a step of evaluating the wear resistance performance of the test piece by comparing the amount of wear of the test piece with a predetermined threshold value.
2. The test method according to claim 1, wherein the wear testing machine is a Laboratory Abrasion Tester LAT100.
3. The test method according to claim 2, wherein in the step of evaluating the wear resistance performance, when the wear amount per unit area (cc/sq·m) of the test piece is less than or equal to a first threshold value which is $3.0 \times 10^{-5} \times$ the slip ratio (%)$^{1.4}$, the wear resistance performance of the test piece is evaluated as being good.
4. The test method according to claim 2, wherein in the step of evaluating the wear resistance performance, when the wear amount per unit area (cc/sq·m) of the test piece is less than or equal to a first threshold value which is $2.5 \times 10^{-5} \times$ the slip ratio (%)$^{1.4}$, the wear resistance performance of the test piece is evaluated as being good.
5. The method according to claim 1, wherein in the step of abrading the ground contact surface, the contact pressure of the ground contact surface is 0.1 to 1 MPa, the rolling speed is 1 to 50 km/h, and the rolling distance is 10 to 30 km.
6. The test method according to claim 5, wherein in the step of evaluating the wear resistance performance, when the wear amount per unit area (cc/sq·m) of the test piece is less than or equal to a first threshold value which is $3.0 \times 10^{-5} \times$ the slip ratio (%)$^{1.4}$, the wear resistance performance of the test piece is evaluated as being good.

7. The test method according to claim 5, wherein
in the step of evaluating the wear resistance performance, when the wear amount per unit area (cc/sq·m) of the test piece is less than or equal to a first threshold value which is $2.5 \times 10^{-5} \times$ the slip ratio $(\%)^{1.4}$, the wear resistance performance of the test piece is evaluated as being good.

8. The test method according to claim 1, wherein
in the step of evaluating the wear resistance performance, when the wear amount per unit area (cc/sq·m) of the test piece is less than or equal to a first threshold value which is $3.0 \times 10^{-5} \times$ the slip ratio $(\%)^{1.4}$, the wear resistance performance of the test piece is evaluated as being good.

9. The test method according to claim 8, wherein
the step of evaluating the wear resistance performance includes: comparing the wear amount per unit area (cc/sq·m) of the test piece with a second threshold value which is $1.0 \times 10^{-6} \times$ the slip ratio $(\%)^{1.4}$.

10. The test method according to claim 8, wherein
the step of evaluating the wear resistance performance includes: comparing the wear amount per unit area (cc/sq·m) of the test piece with a second threshold value which is $3.0 \times 10^{-6} \times$ the slip ratio $(\%)^{1.4}$.

11. A method of manufacturing a tread rubber based on the composition of the rubber material of the test piece whose wear resistance performance is evaluated as being good through the test method according to claim 8.

12. A method of manufacturing a tire comprises a step of manufacturing a tread rubber based on the composition of the rubber material of the test piece whose wear resistance performance is evaluated as being good through the test method according to claim 8.

13. The test method according to claim 1, wherein
in the step of evaluating the wear resistance performance, when the wear amount per unit area (cc/sq·m) of the test piece is less than or equal to a first threshold value which is $2.5 \times 10^{-5} \times$ the slip ratio $(\%)^{1.4}$, the wear resistance performance of the test piece is evaluated as being good.

14. The test method according to claim 13, wherein
the step of evaluating the wear resistance performance includes: comparing the wear amount per unit area (cc/sq·m) of the test piece with a second threshold value which is $1.0 \times 10^{-6} \times$ the slip ratio $(\%)^{1.4}$.

15. The test method according to claim 13, wherein
the step of evaluating the wear resistance performance includes: comparing the wear amount per unit area (cc/sq·m) of the test piece with a second threshold value which is $3.0 \times 10^{-6} \times$ the slip ratio $(\%)^{1.4}$.

16. A tire comprising a tread rubber of which wear amount per unit area (cc/sq·m) is less than or equal to a first threshold value which is $3.0 \times 10^{-5} \times$ a slip ratio $(\%)^{1.4}$, when a test piece is cut out from the tread rubber and the wear amount per unit area (cc/sq·m) is measured by abrading the test piece on a moving abrasive surface of a wear testing machine at the slip ratio of not more than 3.5%.

* * * * *